United States Patent
Fiesel

(10) Patent No.: US 11,460,101 B2
(45) Date of Patent: Oct. 4, 2022

(54) DEVICE FOR FILLING AND REMOVING A LUBRICANT AT A HOUSING

(71) Applicant: ZF Friedrichshafen AG, Friedrichshafen (DE)

(72) Inventor: Sascha Fiesel, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 245 days.

(21) Appl. No.: 16/924,576

(22) Filed: Jul. 9, 2020

(65) Prior Publication Data
US 2021/0010583 A1   Jan. 14, 2021

(30) Foreign Application Priority Data
Jul. 11, 2019   (DE) ..................... 10 2019 210 267.0

(51) Int. Cl.
*F16H 57/04*   (2010.01)
*F16H 57/02*   (2012.01)
*F01M 11/04*   (2006.01)

(52) U.S. Cl.
CPC ..... *F16H 57/0408* (2013.01); *F01M 11/0458* (2013.01); *F16H 57/02* (2013.01)

(58) Field of Classification Search
CPC .. F16H 57/0408; F16H 57/02; F01M 11/0458
See application file for complete search history.

(56) References Cited

U.S. PATENT DOCUMENTS

| | | | | |
|---|---|---|---|---|
| 3,867,999 A | * | 2/1975 | Cox | F01M 11/0458 137/234.6 |
| 6,216,559 B1 | * | 4/2001 | Tanoue | F16H 61/0025 74/606 R |
| 6,244,384 B1 | * | 6/2001 | Few | F16H 57/0408 184/106 |
| 8,960,562 B2 | * | 2/2015 | Neelakantan | F16H 57/0417 236/93 R |
| 10,947,873 B2 | * | 3/2021 | Bach | F04B 43/12 |
| 2008/0169030 A1 | * | 7/2008 | Schoenek | F16H 57/0447 137/434 |

(Continued)

FOREIGN PATENT DOCUMENTS

DE   10 2006 004 520 A1   10/2007
DE   10 2008 003 611 A1   9/2008

(Continued)

OTHER PUBLICATIONS

German Search Report Corresponding to 10 2019 210 267.0 dated Jan. 15, 2020.

*Primary Examiner* — Michael A Riegelman
(74) *Attorney, Agent, or Firm* — Finch & Maloney PLLC; Jay S. Franklin; Michael J. Bujold

(57) ABSTRACT

A filling and draining device for filling lubricant into and draining lubricant out of a housing (1), having a lubricant line (2, 21, 22) through which the lubricant passes into the housing (1), during filling, and through which the lubricant passes when the lubricant is drained from the housing (1). The housing (1) has a valve (6) through which the lubricant flows during filling and draining such that, for filling, the valve (6) adopts a first aperture width for the lubricant and, for draining, the valve (6) adopts a second aperture width for the lubricant.

10 Claims, 1 Drawing Sheet

(56) References Cited

U.S. PATENT DOCUMENTS

2011/0194953 A1* 8/2011 Schalk ................ F16H 57/0408
                                                          417/313
2013/0287593 A1* 10/2013 Erwin ..................... F04B 23/02
                                                          417/63
2021/0010583 A1* 1/2021 Fiesel ................ F16H 57/0408

FOREIGN PATENT DOCUMENTS

| DE | 10 2009 051 820 A1 | 9/2010 | | |
|----|---|---|---|---|
| DE | 10 2012 214 597 A1 | 2/2013 | | |
| DE | 10 2013 222 983 A1 | 5/2015 | | |
| WO | WO-2012031706 A1 * | 3/2012 | ......... | F01M 11/0408 |

* cited by examiner

DEVICE FOR FILLING AND REMOVING A LUBRICANT AT A HOUSING

This application claims priority from German patent application serial no. 10 2019 210 267.0 filed Jul. 11, 2019.

FIELD OF THE INVENTION

The invention relates to a filling and draining device for filling a lubricant into and draining it out of a housing. It also relates to a transmission housing with such a filling and draining device. Furthermore, the invention relates to a method for producing a transmission with an auxiliary power take-off and with such a transmission housing.

BACKGROUND OF THE INVENTION

Technical devices are often lubricated by means of a lubricant and if necessary also cooled thereby. So that the lubricant cannot inadvertently escape, housings are provided for the devices. During the production of the device its housing is filled with the lubricant. This can be done by way of a lubricant line. Thus, during filling the lubricant passes into the housing by way of the lubricant line. Through the lubricant line it is also often possible, if needs be, to drain lubricant out of the housing again. Thus, the lubricant can flow through the line in both directions.

In the case of a vehicle transmission it is known to provide an auxiliary drive on the transmission housing. Such an auxiliary drive, also known as a PTO (PTO=Power Take-Off) serves to branch off a drive power from the transmission to an auxiliary aggregate. In that way, drive power can be delivered not only at the actual drive output of the transmission for the primary purpose of the transmission, but also at other points in order to serve other purposes. For example it is customary to drive an auxiliary aggregate such as an external hydraulic pump or a current generator or a permanent brake (retarder) by way of such a PTO. With such a vehicle transmission it is also known to use a lubricant line leading to such a PTO, both to fill the transmission housing with lubricant and also to drain lubricant out of the transmission housing in order to lubricate the PTO.

Here, the problem arises that on the one hand as large a volume flow of lubricant as possible should flow into the housing during filling in order to keep the filling time as short as possible. On the other hand, the volume flow of lubricant then needed by the PTO is substantially smaller. Thus, when lubricant is drained for the PTO only a certain, smaller volume flow should flow out of the housing.

This has been achieved in that, after filling the transmission housing with lubricant via the lubricant line, a diaphragm is used in the lubricant line. The diaphragm reduces the volume flow of lubricant that can be drained out of the housing through the lubricant line. Thus, only as much lubricant as is needed for the PTO flows through the lubricant line. However, this entails at least one additional production step for fitting the diaphragm. That represents a possible source of error.

SUMMARY OF THE INVENTION

It is therefore necessary, in a housing, to enable filling and draining of lubricant with different volume flows.

This objective is achieved by the measures indicated in each case in the principal claims. Preferred embodiments thereof emerge from the respective subordinate claims.

According to these, a filling and draining device for filling a lubricant into and draining it from a housing is proposed. This proposed filling and draining device comprises a lubricant line via which the lubricant passes into the housing during filling and via which the lubricant emerges from the housing during draining.

It is now provided that the proposed filling and draining device comprises a valve. The lubricant flows through the valve during filling and draining. In particular, the valve is positioned ahead of, or behind, or in the lubricant line. The valve is designed so that during filling it adopts a first aperture width, specifically a (relatively) large aperture width. In particular, this takes place autonomously due to the lubricant flow through the valve. In that way, during filling a (relatively) larger volume flow of lubricant can be produced through the valve and hence through the lubricant line. Furthermore the valve is designed such that for draining, it adopts a second aperture width, specifically a (relatively) small aperture width. In particular, this too takes place autonomously due to the lubricant flow in the valve. In that way it is now possible during draining a (relatively) smaller volume flow of lubricant can be produced through the valve and hence through the lubricant line.

Thus, the valve does not serve to close the lubricant line completely. Depending on the flow direction of the lubricant through it, the valve only adopts different aperture widths according to the flow direction through the valve. Thus, on the one hand rapid filling of the housing with lubricant is enabled, and on the other hand a subsequent, reduced draining of lubricant out of the housing, as necessary, is ensured. If the valve is used in the converse direction, it is also possible for the volumes flow during draining to be made larger than during filling.

In this context "large" and "small" are respectively to be understood not as absolute values, but only relative to one another. This means that the small aperture width always adopts a smaller flow cross-section for lubricant than does the large aperture width.

The (round) diameter of the valve through which lubricant can flow when the aperture width is large, amounts in particular to at least 6 mm. If the cross-section of the line in the valve has to be other than round, then with the large aperture width the valve can also have a cross-sectional area equivalent thereto. In that way, when the usual liquid lubricants for transmissions are used a sufficiently large volume flow for filling can be produced. For the small aperture width the diameter is then reduced, but it is never zero.

The lubricant line can be in the form of a duct, a tube line or a hose line. The lubricant is in particular a liquid lubricant intended for the operating range concerned. Thus, it is passed into the housing in liquid form and drained out of it also in liquid form.

Preferably, the valve has a valve element, in particular exactly only this one valve element. The valve element is in particular a ball, specifically a metal ball. The valve element can be moved by the flow of lubricant in the valve, in particular moved axially. The valve element is now arranged in the valve in such manner that depending on the flow direction of the lubricant, it comes in contact either with a first stop or with a second stop. When it contacts the first stop, the first aperture width is obtained, and when it contacts the second stop, the second aperture width is obtained. In that way a robust and reliable valve can be produced. The respective aperture width is in particular produced because the valve element comes in contact only partially with the stops. Thus, at each stop there is always a certain free space of a particular size (=aperture width)

between the stop and the valve element, through which the lubricant can flow past the valve element.

Preferably, the valve is arranged within the lubricant line. In that way it can be fitted in a space-saving manner.

Preferably, the lubricant line consists of a first partial line and a second partial line. The valve then has a valve chamber. The valve element is arranged inside the valve chamber so that it can be moved axially by the lubricant flow. The two partial lines open into the valve chamber at (axially) opposite ends of the valve chamber. The stops for the valve element are located at the points where the partial lines open into the valve chamber. Thus, when the valve element rests against the stops, the respectively associated (first and second) aperture widths are formed between the valve element and the stop concerned. In this way a particularly robust and reliable valve can be produced. The partial lines can open into the valve chamber at different angles. Thus, between the longitudinal axis of one of the partial lines and the longitudinal axis of the valve chamber there can be a different angle than between the longitudinal axis of the other partial line and the longitudinal axis of the valve chamber. In a preferred embodiment the angle between the longitudinal axis of one of the partial lines and the longitudinal axis of the valve chamber can be between 20° and 60°. In that way the fitting space available can be used to optimum effect.

Preferably, the valve is arranged inside the housing. This protects it against outside influences. In particular the valve and if necessary also at least part of the lubricant line is arranged inside a wall of the housing. In that way no fitting space is needed outside the housing for the valve, nor any fitting space in an inside space of the housing.

A transmission housing is also proposed. In this case it is in particular a transmission housing for a motor vehicle transmission, specifically such as a truck, passenger car or a powered omnibus. However, it can also be a transmission housing for some other aggregate such as a drive-train of a ship or boat, an agricultural or building machine, a rail vehicle, a machine tool, or some other kind of industrial machine. Such a transmission housing serves in particular for enclosing lubricated transmission components, in particular such as gearwheels and/or other elements of the transmission. At the bottom the transmission housing can have a lubricant reservoir which is filled with lubricant during the production process of the associated transmission, as for example an oil sump. The lubricant is then in particular a transmission oil.

The proposed transmission housing has a housing area for the arrangement of an auxiliary PTO on the transmission housing. The transmission housing also has a lubricant line. This lubricant line is provided on the one hand for supplying the PTO with a lubricant from the transmission housing, and on the other hand for the (prior or repeated) filling of the transmission housing with the lubricant. In addition the proposed filling and draining device is provided. In that way, different volumes flows can be obtained during the filling and draining of lubricant through the valve of the filling and draining device.

As explained to begin with, such a PTO serves to tap off drive power from the transmission for an auxiliary aggregate. Thus, drive power can be delivered to the actual transmission drive output for the primary purpose of the transmission, and also to the PTO at some other location in the transmission in order to serve other purposes, for example to drive an auxiliary aggregate. Such PTOs are already known as such.

To supplement the transmission the PTO is positioned on the housing area of the transmission housing and fixed there. The PTO then has transfer means for branching off drive power from the transmission housing and passing it on to a PTO shaft, for example by way of gearwheels. In particular, in the transmission housing at the housing area a port is provided, through which the PTO extends into the transmission housing in order to tap off the drive power from it and pass the power on, out of the transmission housing. The PTO can have a clutch in order, optionally, to decouple the PTO shaft drive-wise from the transmission and re-couple it thereto. At least the transfer means of the PTO must be lubricated with lubricant. Accordingly, during the operation of the PTO lubricant is selectively passed from the transmission housing to the PTO. For that purpose the lubricant line of the transmission housing is provided. Lubricant can be returned from the PTO back into the transmission housing at other suitable points. In this way, a lubricant circuit is formed, which passes through the lubricant line and the valve.

It can be that in the as-delivered condition of the transmission no PTO is present, but one has to be retrofitted. Thus, the proposed transmission housing preferably has the necessary interfaces to allow a PTO to be attached later and then connected to the lubricant line.

Accordingly, the transmission housing preferably has a connection of the lubricant line for the PTO. This connection is located on the area of the housing for arranging the PTO. So by way of the connection, on the one hand the transmission housing can be filled with lubricant, and on the other hand lubricant can be drained out for the PTO. Between the connection and the inside of the housing there is the valve, through which the lubricant flows appropriately during filling and draining.

Preferably, the lubricant line forms a main pressure line. Accordingly, the lubricant line is designed in such manner that the pressure level in it is the same as in a main pressure line of the transmission. In particular the lubricant line branches directly off the main pressure line of the transmission or is connected to the lubricant pump of the transmission. Thus, in the lubricant line the pressure level is set to a predetermined value as constant as possible. Other components of the transmission too work at that pressure level, in particular such as clutches and brakes. The pressure level is in particular set by a pressure-limiting valve or pressure regulating valve of the pump to the predetermined value. In that way the PTO can be lubricated and operated at the main pressure level. At the same time, the valve prevents a needlessly large lubricant volume flow from passing into the PTO, such that the main pressure level falls or the lubricant pump of the transmission has to deliver a needlessly large flow of lubricant. Likewise, however, by choosing a correspondingly small aperture width of the valve when draining the lubricant, the pressure level of lubricant for the PTO can be reduced in a controlled manner, for example to prevent any damage thereto during operation.

A method is also proposed for producing a transmission. The transmission produced thereby has at least one PTO and the proposed transmission housing. Thus, the transmission housing used in this context comprises the proposed filling and draining device with the valve, whereby different volume flows during the filling and draining of the housing are made possible.

In the method, at least the following step (b) is carried out:
 (b) arranging the PTO on the transmission housing, wherein a lubricant line of the PTO is coupled to the lubricant line of the filling and draining device of the transmission housing so that when the PTO is operated, lubricant passes from the transmission housing via the lubricant lines to the PTO and during this the valve of the filling and draining device adopts the second aperture width.

In the method, the following step (a) can be carried out in advance:

(a) the transmission housing is at least partially filled with lubricant, via the lubricant line of the filling and draining device, during which the valve adopts the first aperture width.

The two steps (a) and (b) can be carried out in a different order and/or by different people and/or by different organizations. In particular, step (a) can be carried out by a transmission manufacturer and step (b) can then be carried out by a buyer or refurbisher of transmissions.

BRIEF DESCRIPTION OF THE DRAWINGS

Below, the invention is explained in greater detail with reference to figures from which further preferred embodiments of the invention emerge. The figures show, in each case schematically.

DETAILED DESCRIPTION OF THE PREFERRED EMBODIMENTS

In the figures, the same or at least functionally equivalent components and elements are denoted by identical indexes.

Figure 1:
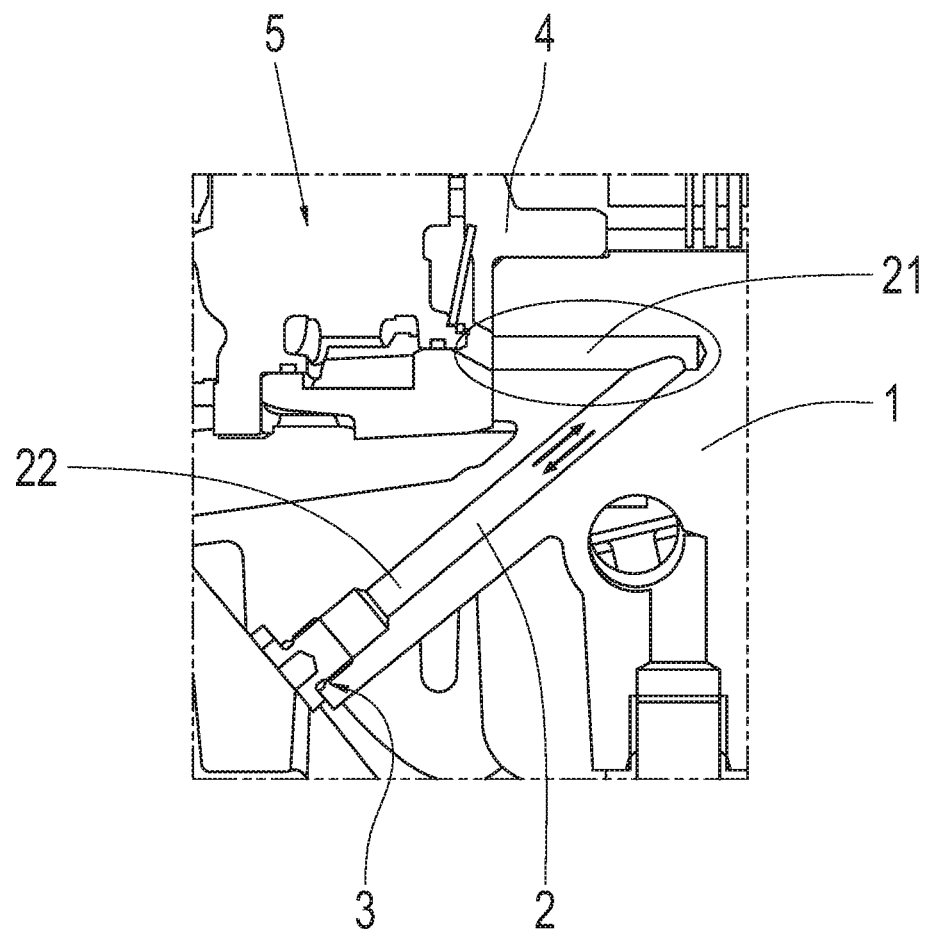
FIG. 1: A section through a transmission housing according to the prior art.

FIG. 1 shows a section through a transmission housing 1 of a motor vehicle known as such. Through the transmission housing 1 there extends a lubricant line 2 in the form of a duct arranged inside the wall of the transmission housing 1.

Outside the transmission housing 1 the lubricant line 2 opens into a connection 3 for a PTO that can be arranged on the transmission housing 1. Thus, on the transmission housing 1 in the area of the exterior outlet of the lubricant line 2 an area of the housing is provided for arranging the PTO on the transmission housing 1, for example an appropriately shaped flange and threaded bores for fixing the PTO. In this part of the housing there is also, in particular, an opening such as a housing window through which the PTO can extend into the transmission housing 1 and through which drive power can be tapped off from the transmission housing 1 for the PTO. In FIG. 1 the connection 3 is sealed by a closure since no PTO is arranged on the transmission housing 1 at the time.

Inside the transmission housing 1 the lubricant line 2 opens into a bore of an intermediate plate 4. On the intermediate plate 4 a lubricant pump 5 is attached. This pump 5 serves to deliver the lubricant present inside the transmission housing 1—also through the lubricant line 2, when a PTO is connected thereto. The lubricant line 2 is connected directly to the pump 5. If necessary the pump 5 can have a pressure regulating valve for adjusting the pump pressure. Accordingly, inside the lubricant line 2 there is a particular and if needs be a regulated main pressure of the lubricant system. Thus, the lubricant line 2 is a main pressure line.

For example, the lubricant line 2 has two partial lines 21, 22. These are arranged at an angle to one another so that the fitting space available is used optimally. Moreover, in that way the outlets of the lubricant line 2 are positioned at the necessary places.

In the present case the lubricant line 2 serves not only for draining lubricant out of the housing 1 when a PTO is connected thereto, but also for at least partially filling the housing 1 with the lubricant. Thus, the lubricant line 2 with its connection 3 form a filling and draining device for filling and draining the lubricant into and out of the housing 1.

During filling, the lubricant is passed into the inside of the housing via the connection 3 and the lubricant line 2. Conversely, during draining the lubricant passes out of the housing through the lubricant line 2 and the connection 3. During the draining process the return flow of the lubricant back into the transmission housing 1 takes place at other points, for example through the PTO. Thus, there are two possible flow directions for the lubricant through the lubricant line 2. In FIG. 1 these flow directions are indicated by oppositely directed arrows.

During filling a relatively large volume flow of lubricant is needed in order to keep the filling time short. In contrast, during draining a relatively smaller volume flow of lubricant is required in order to prevent unnecessary and possibly damaging oversupply of the PTO with lubricant. This can be done after filling by positioning an extra diaphragm in the lubricant line 2 or the connection 3. However, this represents an additional process step and thus a potential source of error.

Accordingly it is proposed to provide a valve for the lubricant in the filling and draining device shown in FIG. 1, which valve produces different aperture widths depending on the flow direction of the lubricant. Thus, automatically and without further process steps different volumes flows and/or pressures are obtained, on the one hand during filling and on the other hand during draining.

Figure 2:
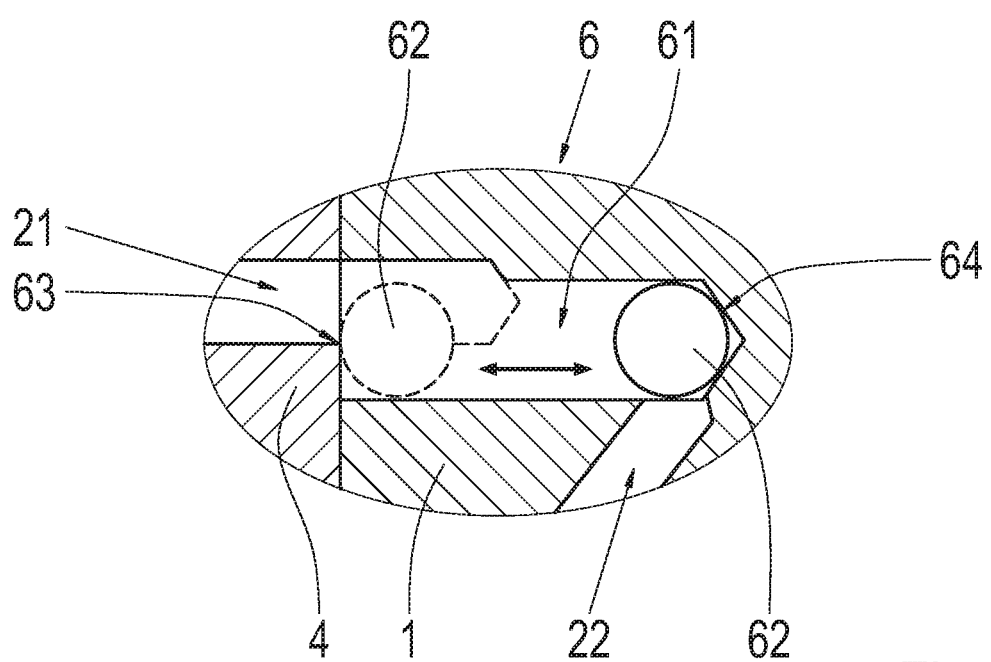
FIG. 2: A proposed valve for a filling and draining device for the transmission housing of FIG. 1.

FIG. 2 shows as an example a possible design of such a valve 6. The valve 6 is arranged inside the lubricant line 2 in the area circled in FIG. 1. The valve 6 has a valve chamber 61 into which the two partial lines open. In FIG. 2 the outlet of the partial line 21 is at the left-hand end of the valve chamber 61 and the outlet of the partial line 22 is at the right-hand end of the valve chamber 61. Specifically, the partial line 21 opens axially into the valve chamber 61. Specifically, the partial line 22 opens laterally into the valve chamber 61. Thus, there are different angles between the longitudinal axes of the valve chamber 61 and the respective longitudinal axes of the partial lines 21, 22.

Inside the valve chamber 61 there is provided (exactly) one valve element 62. The valve element 62 is for example in the form of a metal ball. The valve element 62 can be moved axially within the valve chamber 61 by the flow of lubricant. That is indicated by the double-arrow shown in FIG. 2. At the outlets of the partial lines 21, 22 stops 63, 64 are provided for the valve element 62. Depending on the flow direction, the valve element 62 will rest against the stops 63, 64. Thus, during filling the valve element 62 rests against the stop 63 (on the left), which corresponds to a first valve position. And during draining the valve element 62 rests against the stop 64 (on the right), which corresponds to a second valve position. The valve element 62 against the (left-hand) stop 63 is represented by a broken line, whereas the same valve element 62 against the (right-hand) stop 64 is represented by a continuous line.

The stops 63, 64 and/or the valve element 62 are designed such that a free space (for example a gap) always remains between the stop 63, 64 and the valve element 62 for the lubricant to flow past the valve element 62 when the valve element 62 is up against the stop. Thus, a certain volume flow of lubricant can flow past the valve element 62 and through the lubricant line 2. The free space remaining at each stop 63, 64 forms the aperture width of the valve 6 in its respective valve position. The free spaces at the stops 63, 64 and hence the aperture widths of the valve 6 in its two valve positions are different from one another. Consequently, depending on the flow direction the valve 6 automatically provides different aperture widths on the one hand while the transmission housing 1 is being filled with lubricant, and on the other hand while lubricant is being drained out of the transmission housing 1.

The filling of the transmission housing 1 with lubricant through the lubricant line 2 can be carried out at some other place and by some other person or organization than the fixing of the PTO to the transmission housing 1. For example the filling takes place at a transmission manufacturer, particularly toward an end of the production process there. Then the transmission is transported to a purchaser. Only there is the PTO arranged on the transmission, so completing the actual production of the transmission. For that, in a production step carried out by the purchaser the PTO is fitted onto the transmission housing 1. During this, on the one hand elements of the PTO are coupled to the transmission in order to tap off drive power. On the other hand, a lubricant line of the PTO for lubricating the PTO is coupled to the lubricant line 2 of the filling and draining device in the transmission housing 1. For example this is done by coupling the connection 3 shown in FIG. 1 to the lubricant line of the PTO. As a result, when the PTO is operating the lubricant passes from the transmission housing 1 by way of the lubricant line 2 and the valve 6 (see FIG. 2) to the PTO, and during this the valve 6 adopts the smaller aperture width. Consequently it is ensured that during its operation (i.e. while it is receiving lubricant from the transmission housing 1) the PTO is only supplied with a necessary, reduced volume flow of lubricant, instead of the large volume flow required during filling.

A corresponding process can also be carried out by a refurbisher of a used transmission, on which no PTO was previously arranged, but which is in principle suitable for it. Thus, by virtue of the above-described retrofitted arrangement of a PTO on the transmission, the transmission is enabled to carry out new tasks for which it is again fully equipped.

INDEXES

1 Housing, transmission housing
2 Lubricant line
21 Partial line
22 Partial line
3 Connection
4 Intermediate plate
5 Lubricant pump
6 Valve
61 Valve chamber
62 Valve element
63 Stop
64 Stop

The invention claimed is:

1. A filling and draining device for filling and draining a lubricant into or from a housing, the filling and draining device comprising:
   a lubricant line through which, during filling, the lubricant flows into the housing, and, during draining, the lubricant flows out of the housing,
   a valve through which the lubricant flows during filling and draining, and the valve adopts a first aperture width for the lubricant for filling and the valve adopts a second aperture width for the lubricant for draining.

2. The filling and draining device according to claim 1, wherein the valve has a valve element which is arranged in the valve in such a manner that due to the flow of the lubricant and depending on a flow direction of the lubricant, the valve element either moves into contact with a first stop where the valve element produces the first aperture width, or moves into contact with a second stop where the valve element produces the second aperture width.

3. The filling and draining device according to claim 2, wherein the lubricant line comprises a first partial line and a second partial line,
   the valve has a valve chamber,
   the valve element is arranged and axially movable in the valve chamber and the first and the second partial lines open into the valve chamber at opposite ends of the valve chamber,
   the first and the second stops (63, 64) for the valve element are arranged, in each case, at outlets of the first and the second partial lines into the valve chamber,
   when the valve element rests against the first stop, the first aperture width is formed between the first stop and the valve element, and
   when the valve element rests against the second stop, the second aperture width is formed between the second stop and the valve element.

4. The filling and draining device according to claim 1, wherein the valve is arranged inside the lubricant line.

5. The filling and draining device according to claim 1, wherein the valve is arranged inside the housing.

6. The filling and draining device according to claim 5, wherein the valve is arranged inside a wall of the housing.

7. A transmission housing with a housing area for arranging a power take-off (PTO) on the transmission housing, and with a lubricant line for supplying the power take-off (PTO) with a lubricant from the transmission housing and for filling the transmission housing with the lubricant,
   a filling and draining device comprising the lubricant line through which, during filling, the lubricant flows into the housing, and, during draining, the lubricant flows out of the housing, and
   a valve through which the lubricant flows during filling and draining, the valve adopts a first aperture width for the lubricant for filling and the valve adopts a second aperture width for the lubricant for draining.

8. The transmission housing according to claim 7, wherein the transmission housing has a connection of the lubricant line for the power take-off (PTO) in the housing area provided for arranging the power take-off (PTO).

9. The transmission housing according to claim 7, wherein the lubricant line is a main pressure line.

10. A method of producing a transmission with a power take-off (PTO) and with the transmission housing according to claim 7, the method comprising at least:
    arranging the power take-off (PTO) on the transmission housing in such a manner that a lubricant line of the power take-off (PTO) is coupled with the lubricant line of the filling and draining device of the transmission housing such that, during operation of the power take-off (PTO), the lubricant is drawn from the transmission housing, via the lubricant line, into the power take-off (PTO), and during operation of the power take-off (PTO) the valve adopts the second aperture width.

* * * * *